(No Model.)  7 Sheets—Sheet 1.

C. J. SCHRAMM.
DEVICE FOR RAISING AND TRANSPORTING VESSELS.

No. 579,184.  Patented Mar. 23, 1897.

Witnesses
Jas. K. M?Cathran
D. P. Holhaupter

Inventor
Charles J. Schramm
By his Attorneys
C. A. Snow & Co.

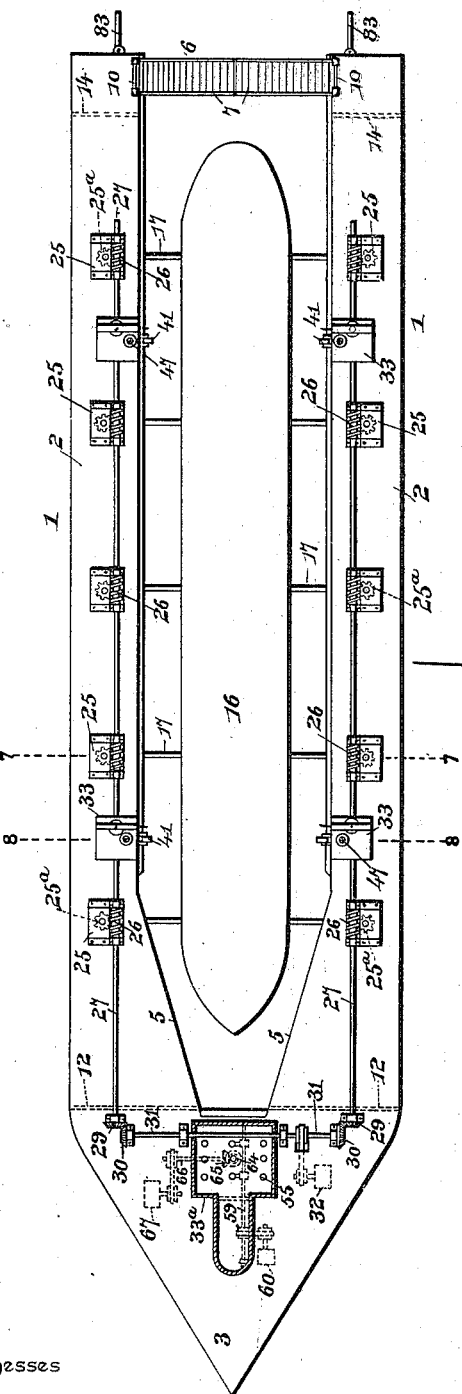

(No Model.) 7 Sheets—Sheet 3.

C. J. SCHRAMM.
DEVICE FOR RAISING AND TRANSPORTING VESSELS.

No. 579,184. Patented Mar. 23, 1897.

Witnesses
Jas. K. McCathran
D. P. Nothant Prd.

By his Attorneys,
C. A. Snow & Co.

Inventor
Charles J. Schramm (No Model.) 7 Sheets—Sheet 4.
C. J. SCHRAMM.
DEVICE FOR RAISING AND TRANSPORTING VESSELS.
No. 579,184. Patented Mar. 23, 1897.
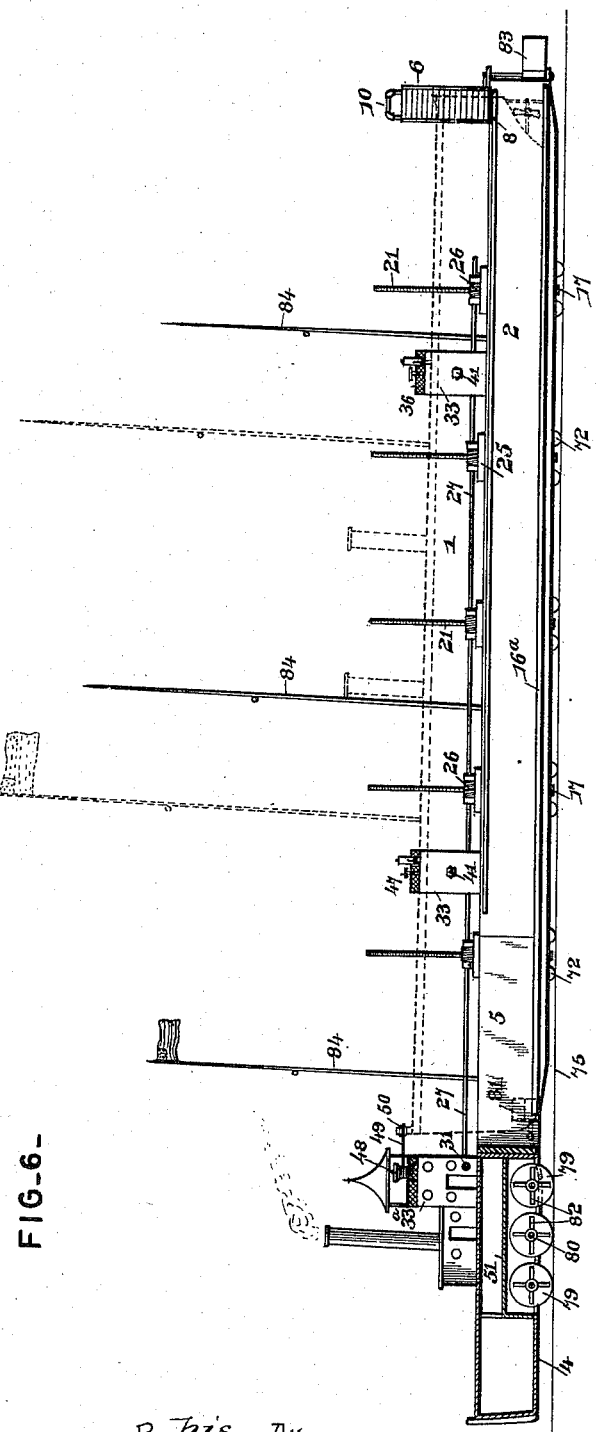
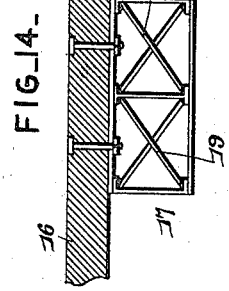
Witnesses
Inventor
Charles J. Schramm (No Model.) 7 Sheets—Sheet 5.
C. J. SCHRAMM.
DEVICE FOR RAISING AND TRANSPORTING VESSELS.
No. 579,184. Patented Mar. 23, 1897.
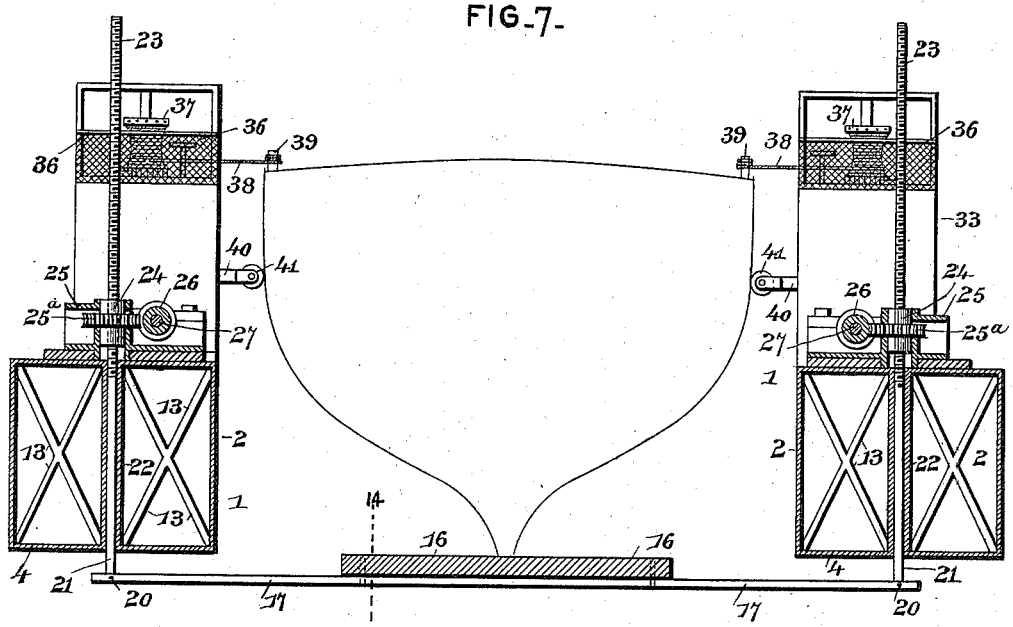
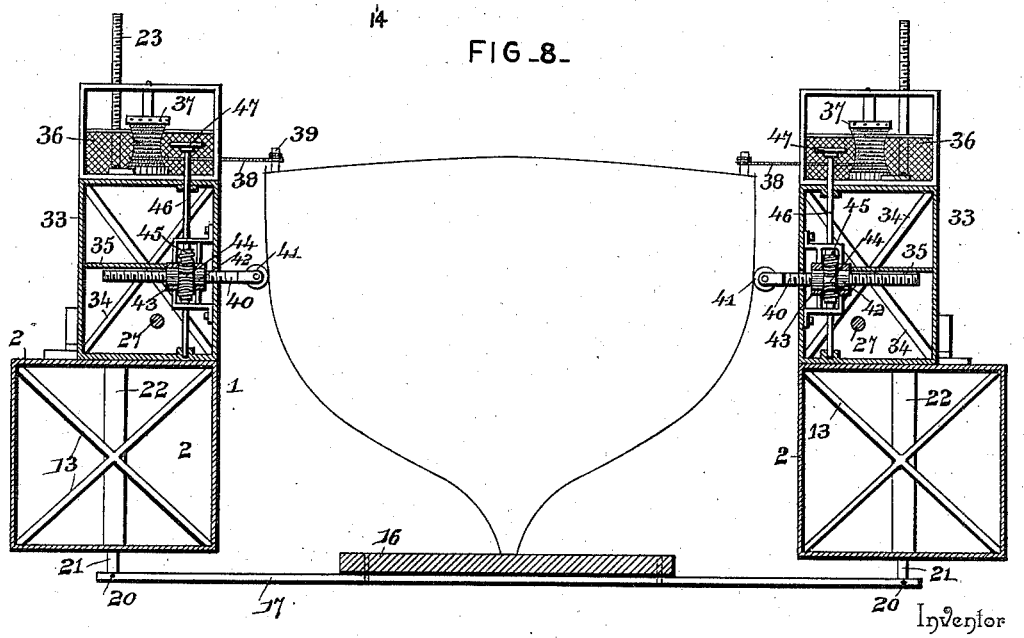

(No Model.) 7 Sheets—Sheet 6.

C. J. SCHRAMM.
DEVICE FOR RAISING AND TRANSPORTING VESSELS.

No. 579,184. Patented Mar. 23, 1897.

Witnesses
Jas. K. McCathran
L. P. Holhaupt

Inventor
Charles J. Schramm
By his Attorneys,
C. A. Snow & Co.

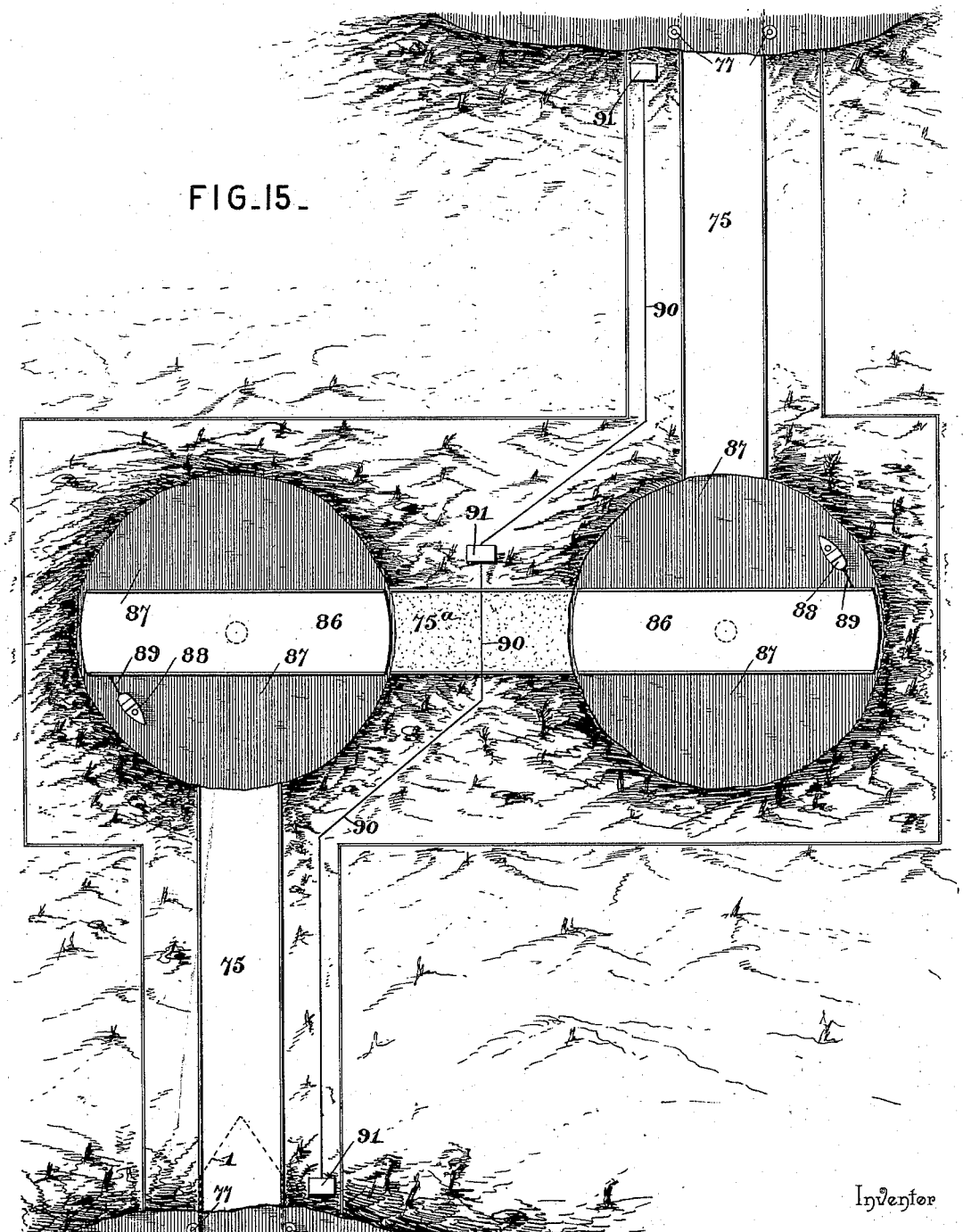

UNITED STATES PATENT OFFICE.

CHARLES J. SCHRAMM, OF FAYETTEVILLE, TEXAS.

DEVICE FOR RAISING AND TRANSPORTING VESSELS.

SPECIFICATION forming part of Letters Patent No. 579,184, dated March 23, 1897.

Application filed June 16, 1896. Serial No. 595,816. (No model.)

*To all whom it may concern:*

Be it known that I, CHARLES J. SCHRAMM, a citizen of the United States, residing at Fayetteville, in the county of Fayette and State of Texas, have invented a new and useful Locomoto-Barge, of which the following is a specification.

This invention relates to a locomoto-barge, having for its object the raising and carrying of vessels of all kinds over shallow places and bars in streams, rivers, and harbors, or over dry land between any two ports.

To this end the main and primary object of the present invention is to provide a new and useful construction of barge having simple and powerful means for raising ships and vessels to a sufficient height so that the same may readily be carried through the water over shallow places or bars, and the barge is also equipped with means for being propelled through the water to carry a ship or vessel, and also for being propelled over a track, so as to act as a combined locomotive and ship-car when carrying a ship or vessel over dry land.

The invention also contemplates a construction of barge of the character described that can be readily adapted for use in raising sunken ships or bodies.

With these and other objects in view, which will readily appear as the nature of the invention is better understood, the same consists in the novel construction, combination, and arrangement of parts hereinafter more fully described, illustrated, and claimed.

Figure 1:
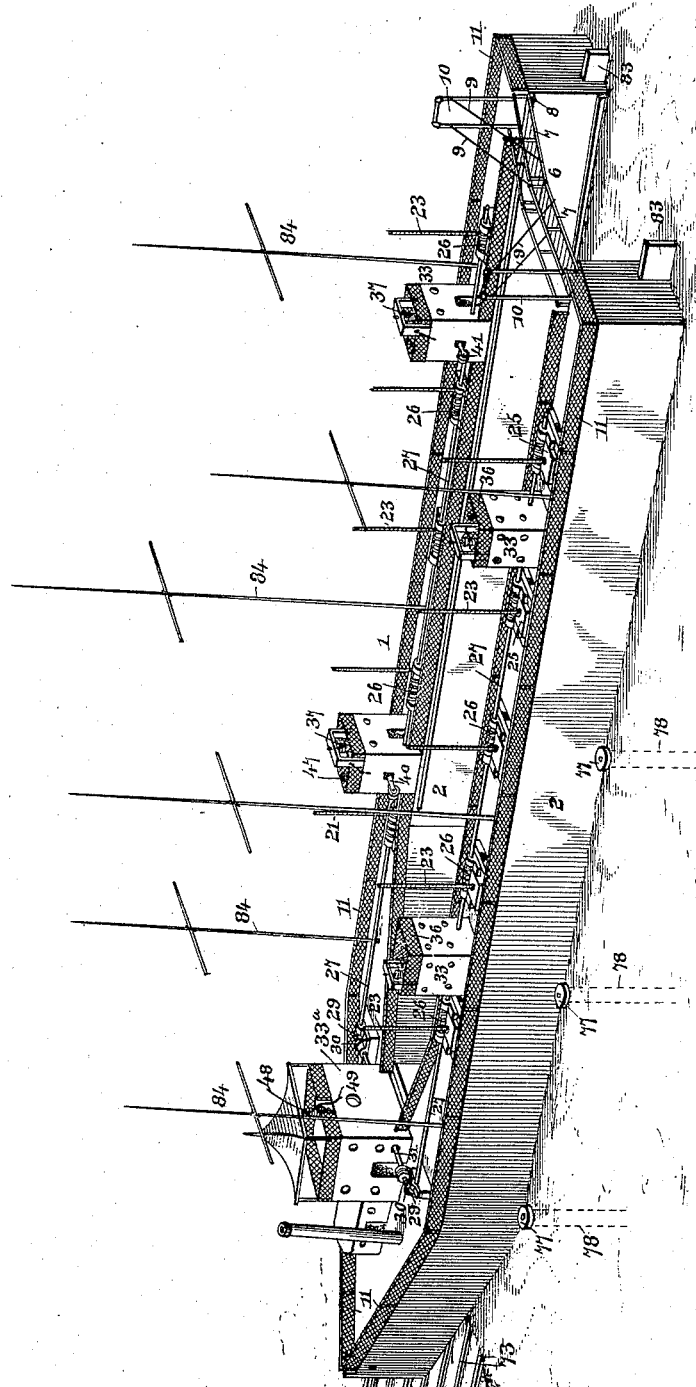
Figure 4:
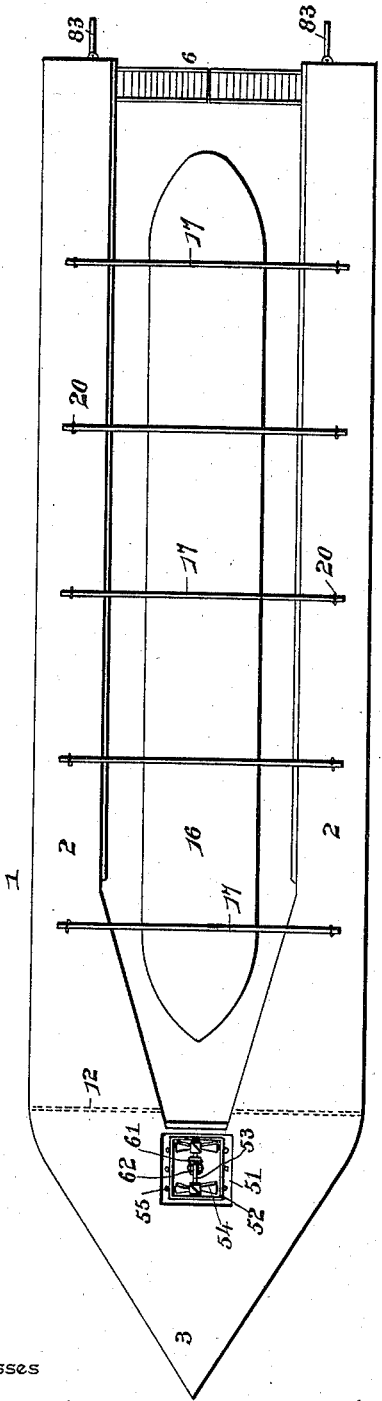
Figure 5:
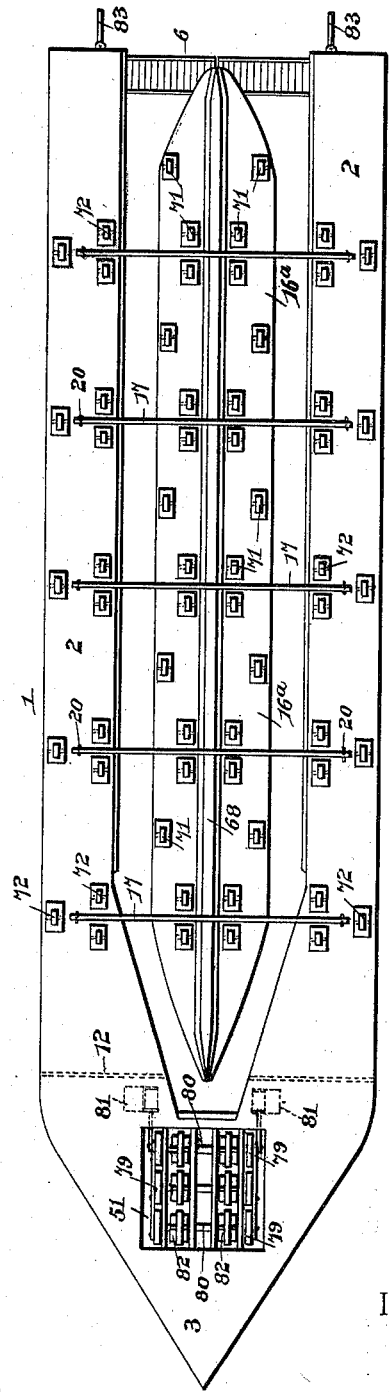
Figure 9:
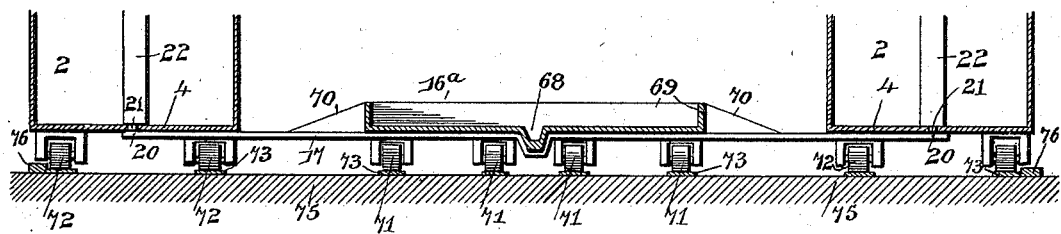
Figure 10:
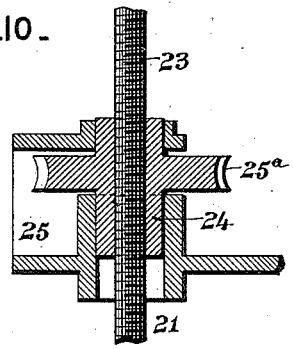
Figure 11:
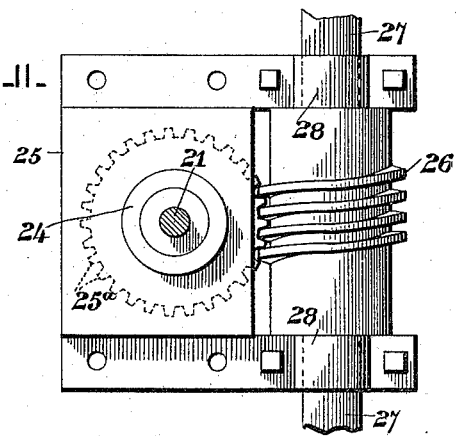
Figure 12:
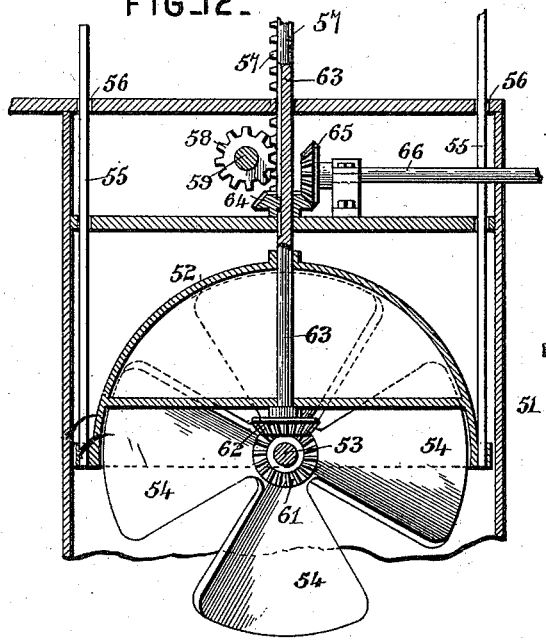
Figure 13:
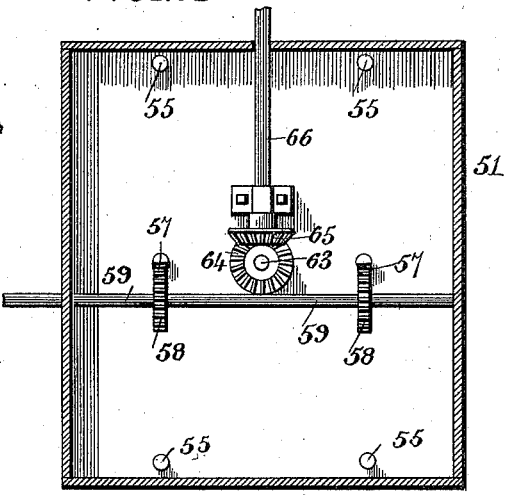

In the drawings, Figure 1 is a perspective view of a locomoto-barge constructed in accordance with this invention. Fig. 2 is a top plan view thereof, partly in section. Fig. 3 is a central vertical longitudinal sectional view thereof. Fig. 4 is a bottom plan view of the barge. Fig. 5 is a similar view showing the barge modified when used both in the water and on dry land. Fig. 6 is a longitudinal sectional view of the barge modified as illustrated in Fig. 5 of the drawings. Fig. 7 is a transverse sectional view on the line 7 7 of Fig. 2. Fig. 8 is a similar view on the line 8 8 of Fig. 2. Fig. 9 is a transverse sectional view at the bottom of the barge adapted for use as a ship-car. Fig. 10 is a detail sectional view of an adjusting-nut for one of the screw lifting-rods. Fig. 11 is a plan view of the gearing for operating one of the adjusting-nuts for a lifting-rod. Fig. 12 is an enlarged detail sectional view of the vertically-adjustable propelling mechanism for the barge when used exclusively in water. Fig. 13 is a deck plan view directly above the adjustable propelling mechanism. Fig. 14 is a detail sectional view on the line 14 14 of Fig. 7. Fig. 15 is a diagrammatic plan view of a track arrangement for the locomoto-barge in traveling over land.

Referring to the accompanying drawings, 1 designates a barge having a buoyant body essentially comprising opposite parallel tubular side floats 2 and a hollow pointed prow portion 3, connecting and merging into the front ends of the tubular side floats 2 and forming the front or prow of the barge, so as to easily cut the water and allow the barge to be propelled therethrough at a reasonable rate of speed when carrying ships or vessels over shallow places or bars in a stream or harbor. The buoyant body of the barge is constructed of any suitable material and in a sufficient size and length so as to be capable of carrying bodily any ship or vessel that can pass into the space between the tubular side floats 2 of the barge-body. The said tubular side floats of the barge-body are preferably rectangular in cross-section, and, together with the hollow prow portion 3, are provided with flat bottoms 4, so as to give the barge a large floating-surface and a light draft in the water. The barge is therefore so constructed as to have the greatest degree of buoyancy and so as to draw the minimum amount of water, and thereby be capable of floating over extremely shallow places in rivers, streams, and harbors. The side floats of the body are arranged substantially parallel nearly their entire length, but toward the prow end 3 of the barge the inner side portions of the opposite side floats 2 are forwardly converged, as at 5, so as to form a space between the side floats and within the barge-body substantially conforming to the general exterior contour of a ship or vessel, it being noted that the forwardly-convergent inner sides 5 of the side float form a contracted tapering space designed to receive the prow or stem of a ship or vessel that lies within the buoyant barge-body, as will be readily understood.

The opposite tubular side floats 2 of the buoyant barge-body extend rearwardly from the front prow portion 2 in a straight line. The remaining length of the barge and the space between the rear unconnected ends of the said side floats allow a ship or vessel to readily pass into the barge-body and out of the same, and at the said rear unconnected ends of the side floats 2 is arranged a cross-bridge 6, preferably comprising the separate bridge-sections 7, hinged at their outer ends, as at 8, respectively, to the opposite side floats 2 at their rear extremities and at the top sides thereof. The said hinged bridge-sections 7 when in their lowered positions, so as to aline and form a passage-way from one side float to the other at the rear end of the barge, are supported in position by the brace-cables 9, connected with the said bridge-sections 7 and with the arched frames 10, mounted on top of the floats 2 at the outer hinged ends of the bridge-sections, said bridge-sections being raised and lowered in any suitable manner.

In connection with the cross-bridge 6 the entire deck of the barge-body, including the side floats and front prow portion 3, is provided at all of its edges with the guard-railing 11, so as to protect the passage-ways over the entire deck and allow the crew of the boat to safely work thereon. This construction practically completes the barge-body, but at this point it is to be observed that the opposite tubular side floats 2 of the barge-body are partitioned at their front ends, as at 12, from the interior space of the front hollow prow portion 3 of the barge, and said side floats are designed to be filled with compressed air, so as to form the main buoys of the barge, and said side floats are provided therein with interior crossed brace-irons 13, that serve to strengthen and brace the floats, so that the same will be sufficiently strong to float very heavy bodies without being submerged at a great depth in the water. At their extreme rear ends the said side floats 2 of the barge-body are provided with the ballast-compartments 14, adapted to hold therein suitable ballast for balancing the front prow end of the barge carrying the machinery for lifting and propelling purposes, as will be more particularly referred to.

Arranged to work below and within the barge-body, between the opposite tubular side floats 2 thereof, is a raising-platform 16, that is of a length nearly equaling the length of the side floats 2, and is preferably made of heavy timber, which is preferably painted, so as to resist the action of the water and thereby be preserved. The raising-platform 16 is narrower in width than the space between the opposite side floats 2 of the barge-body and is bolted or otherwise suitably fastened on the upper side of a series of transverse cross-beams 17. The transverse cross-beams are preferably tubular, so as to have the greatest degree of lightness, but are provided with interior crossed bracing-strips 19, securely bolted to the top, bottom, and sides of the beams, so as to rigidly brace and strengthen the same, so that the strength of the entire series of cross-beams will be sufficient for raising the platform 16 to the desired elevation with the ship or vessel resting thereon, as illustrated in Figs. 7 and 8 of the drawings.

The cross-beams 17, passing under and supporting the centrally and longitudinally arranged raising-platform 16, are securely pinned or otherwise rigidly connected at their opposite ends, as at 20, to the lower ends of vertically-adjustable screw lifting-rods 21, arranged to slide in the guide-tubes 22, fitted vertically within the opposite side floats 2 and extending from the top to bottom thereof to form guides for the rods 21 and allow such rods to work above and below the side floats in raising and lowering the raising-platform 16.

There is any desired number of cross-beams 17 and lifting-rods 21, according to the size and length of the barge-body, as will be readily understood, and by reason of the arrangement described each of the side floats 2 will have a series of the lifting-rods 21 working therein. From their upper ends the lifting-rods 21 are threaded for a greater portion of their length, as at 23, and said threaded portions of the lifting-rods work in the interiorly-threaded adjusting-nuts 24, journaled in bearing-brackets 25, mounted on the upper sides or decks of the side floats 2, and the said adjusting-nuts 24 for the screw lifting-rods 21 are provided with the integral horizontally-disposed worm-pinions $25^a$, meshing with the operating-worms 26 on the longitudinal worm-shafts 27, turning in suitable shaft-bearings 28 on each of the bearing-brackets 25 and arranged longitudinally on the deck of the floats 2 and extending nearly the entire length of said floats.

Each of the side floats 2 has one of the shafts 27 arranged thereon, so as to simultaneously adjust the entire series of lifting-rods supported in such float, and the opposite longitudinally-arranged worm-shafts 27 are provided at their front extremities with the gears 29, meshing with adjacent gears 30 at the opposite ends of a drive-shaft 31, mounted transversely on the front prow portion 3 of the barge-body and geared with a suitable engine 32 within the said prow portion of the barge, said engine having suitable controlling means of any character whereby the worm-shafts 27 may be put in motion and stopped at will to provide for the proper adjustment of the lifting-rods 21 and the desired elevation of the raising-platform 16.

At suitable points each of the opposite side floats 2 has arranged on its deck upright fastening-towers 33, each of which towers is preferably provided with interior bracing 34 to strengthen the same and with a floor-partition 35 to form rooms within the tower, which can be used as living-rooms for the crew or for any other purpose that may be required. Each of said towers 33 for each side float 2 is arranged on the deck of the float directly at the inner side thereof and supports on the top a railing 36 and an upright capstan 37, on which winds and unwinds a fastening-cable 38, adapted to be secured, as at 39, to the opposite sides of a ship or vessel when raised within the barge-body on the raising-platform 16, as illustrated in Figs. 7 and 8 of the drawings, and at a point intermediate of the upper and lower end of each of the fastening-towers 33 is arranged a horizontally-adjustable screw brace-rod 40, carrying at its outer end a roller 41, adapted to be adjusted in contact with the adjacent side of the ship or vessel within the barge. The screw brace-rod 40 works horizontally in the fastening-tower and within an adjusting-nut 42, journaled in a bearing-bracket 43, secured within the tower and having a worm-pinion 44, meshing with a worm 45 on an upright adjusting-shaft 46, journaled vertically within the tower and provided at its upper end above the top of the tower with a hand-wheel 47, so as to be conveniently under control of the operator controlling the capstan 37 on top of the tower. All of the fastening-towers 33 are equipped in the manner described to provide for securing and bracing the ship or vessel properly in its raised position while the barge is carrying the same over a bar or shallow place or on land.

In addition to the side fastening-towers 33 the barge has erected on the front portion thereof, at the extreme front end of the space to receive the ship or vessel, a front tower 33ª, designed to have therein any controlling parts of the machinery for operating the barge and supporting on the top thereof a capstan 48, on which winds and unwinds the fastening-cable 49, which is secured to the prow of the ship or vessel within the barge, as at 50, so as to securely anchor said ship or vessel in place, and preventing the same from floating out of the barge until released, as will be readily understood.

When the barge is used exclusively in the water to provide for raising and carrying ships and vessels over bars and shallow places, screw propelling mechanism is employed in connection with the open propeller-housing 51, built within the front prow portions 3 of the barge, at the center and under side thereof. When the screw propelling mechanism is employed for propelling the barge through the water, the propeller-housing 51 accommodates for vertical adjustment therein a semicylindrical wheel-casing 52, in which casing are journaled the opposite extremities of a wheel-shaft 53, on which is mounted a pair or more of screw propeller-wheels 54 of the usual construction, but preferably arranged one in advance of the other and rotating at right angles to the length of the barge to provide for propelling the barge through the water. The wheel-casing 52 for the propeller-wheels has attached thereto the lower ends of a series of guide-rods 55, mounted to slide through suitable guide-openings 56 at the top of the housing 51 and in the deck of the barge, and a pair of the guide-rods 55 are provided with longitudinal racks 57, meshing with the adjusting-pinions 58, mounted on a transverse adjusting-shaft 59, suitably geared with an engine 60, mounted within the front prow portion of the barge and operated to turn the shaft 59 in either direction for adjusting the wheel-casing 52 up or down, and thereby adjusting the projection of the propeller-wheels 54 in the water according to the depth of the water at any particular point over which the barge is being propelled. The wheel-shaft 53 has fitted thereon at an intermediate point a beveled gear-pinion 61, meshing with a pinion 62 at the lower end of a vertical countershaft 63, having feathered thereon at the top of the housing 51 a beveled gear-pinion 64, meshing with a similar adjacent pinion 65 at one end of a drive-shaft 66, geared with a suitable engine 67 for propelling the barge, it being noted that the shaft 63 slides in and turns with the pinion 64, so as to permit of the ready vertical adjustment of the propeller-wheels without interfering with the turning of such wheels to propel the barge.

In adapting the barge for propulsion both through water and over dry land a slight modification thereof is to be observed, as illustrated in Figs. 5, 6, and 9 of the drawings. In this modification of the barge the raising-platform 16ª is slightly modified to form a car and is provided with a central longitudinal depression 68, forming a seat for the keel of the ship or vessel resting on the platform, and said platform is further provided with raised sides and ends 69, the raised sides being braced by suitable braces 70 with the cross-beams 17, to provide for holding the platform as rigid as possible and preventing undue vibration thereof in transit over dry land. The raising-platform 16ª of this form of the invention is further provided on its under side with separate sets of alined traveler-wheels 71, corresponding to the traveler-wheels 72, mounted at the under side of the opposite side floats 2, all of said traveler-wheels 71 and 72 being adapted to ride on the flat track-rails 73 of a wide-surface track 75, adapted to be built on the land and having in addition to the rails 73 the opposite side guard-rails 76, at the inner sides of which rails 76 travel the outermost series of traveler-wheels 72, so as to hold the barge properly in position on the wide track while being propelled thereover to carry a ship or vessel over dry land. When the barge, equipped with the traveler-wheels, as described, is directed, while in the water, toward the track 75, which leads to the water's edge, the said barge is designed to pass in between opposite parallel series of guide-wheels 77, mounted at the surface of the water on the upper ends of posts 78, sunk in the bed of the water, and said guide-rollers 77 are arranged in line with the said guard-rails 76 of the track 75, so as to guide the barge perfectly true onto the track, as will be readily apparent.

In the form of the barge as adapted for propulsion through water and also over dry land on the track 75, instead of the screw propeller-wheels is employed a set of track-wheels 79. The set of track-wheels 79 are arranged in any desired number and are mounted on the wheel-axles 80, journaled in suitable bearings within the propeller-housing 51, and suitably geared in any manner with the driving-engines 81, mounted within the front or prow portion of the barge. The said track-wheels 79 project sufficiently below the bottom of the barge so as to travel on the rails of the track, and certain of said wheels are provided at one side with propelling-paddles 82, forming paddle-wheels which provide for the propulsion of the barge when in the water, so it will be seen that the wheels 79 are constructed so as to act in the double capacity of track and propelling wheels for the barge.

The barge is provided at the rear ends of its side floats 2 with rudders 83, controlled in any suitable manner for guiding the boat in the water, and in supplement to the propelling mechanism the barge may be provided at suitable points with sail-masts 84, designed to carry sails for assisting to propel the barge in the water in case of emergency or otherwise.

In using the barge the raising-platform is lowered sufficiently to allow a ship or vessel to enter the space between the side floats, and after having placed the ship or vessel thus in position the raising-platform is elevated to a sufficient height so as to elevate the ship or vessel in a position for carrying the same over shallow places or bars or over dry land on the track, and when properly elevated the ship or vessel is securely fastened or braced within the barge by the means herein particularly specified.

While the locomoto-barge has been specifically described for raising ships and vessels for transporting the same in the water or over land, it will be obvious that the barge may be used for raising sunken vessels or other objects by suitably connecting the sunken object with the lifting-rods 21, which lifting-rods are elevated by the worm speed-gearing described.

In propelling the locomoto-barge on the track 75 over dry land it will be obvious that by reason of the length of the barge and the character of the track it is only possible to propel the barge in a straight direction, either forward or backward. For this reason it is necessary to provide an arrangement whereby the barge can be propelled from one port to another, so that it can pass around mountains or make any angle necessary to reach the desired destination. To secure this result, I have provided a track arrangement which is diagrammatically illustrated in Fig. 15 of the drawings. In this figure of the drawings the wide-surface track 75 is illustrated as being built on land and having its opposite terminals leading to the water's edge in connection with the guide-wheels 77 at oppositely-located points or ports. The opposite terminals of the track are not in direct alinement with each other and are illustrated as being disposed at direct right angles to a short intermediate track-section 75$^a$, which is designed to be connected with the main portions of the track by the track turn-tables 86, arranged to operate at opposite ends of the track-section 75$^a$ and adapted to be alined with the said short track-section 75$^a$ and also with the main portions of the track in a straight line with the track-terminals.

The track turn-tables 86 are of any approved construction and pivotally supported in the usual manner; but in the present invention said turn-tables are designed to be partly floated in artificial turn-table lakes 87, formed at the desired or required points along the line of the track on which the locomoto-barge is propelled. The turn-table lakes 87 are of a sufficient size and depth for the purposes of accommodating the movement of the turn-table and for partly floating the same, and said turn-tables may be conveniently swung into position with either of the main portions of the track 75 or the track-section 75$^a$ by one or more tug-boats 88, designed to be stationed in the lakes and to have suitable hawser connections 89 with the turn-tables. A telegraphic line 90, in connection with suitably-arranged telegraphic stations 91, may be employed in connection with the track and the oppositely-located ports between which the locomoto-barge plies its way.

While a pair of turn-tables have been described in connection with a short track-section 75$^a$, it will be obvious that by carrying out the same principle the track may be carried over the land at various angles in connection with various turn-tables, according to the physical formation of the country, as will be readily understood.

Various changes in the form, proportion, and the minor details of construction may be resorted to without departing from the principle or sacrificing any of the advantages of this invention.

Having thus described the invention, what is claimed, and desired to be secured by Letters Patent, is—

1. In a barge of the class described, a buoyant barge-body having opposite floats and a hollow prow portion connecting the front ends of said floats, said hollow prow portion of the barge-body being formed at the central under side thereof with a propeller-housing open at its lower side, suitable raising and supporting devices for a ship or vessel, and propelling mechanism mounted for rotation within the propeller-housing of the prow portion of the barge-body, substantially as set forth.

2. In a locomoto-barge, a buoyant barge-body comprising opposite parallel tubular side floats and a hollow pointed prow portion connecting the front ends of the tubular side floats, a cross-bridge connecting the rear ends of said side floats and comprising separate hinged sections, a suitable raising and supporting device for the ship or vessel, and propelling mechanism arranged at the prow end of the barge, substantially as set forth.

3. In a locomoto-barge, a buoyant barge-body having opposite floats and a hollow prow portion connecting the front ends of said floats, suitable raising and supporting devices for the ship or vessel, and vertically-adjustable propelling mechanism mounted within the front prow portion of the barge-body, substantially as set forth.

4. In a barge of the class described, the barge-body having opposite side floats unconnected at their rear ends, a raising-platform arranged to work below and between said floats, a series of transverse cross-beams secured to the platform, vertically-adjustable screw lifting-rods guided for movement in the opposite side floats and connected at their lower ends with said cross-beams, adjusting-nuts mounted on the floats and receiving the screw lifting-rods, said nuts having worm-pinions, continuous worm-shafts arranged longitudinally on the opposite floats and having at intervals worms engaging said worm-pinions, a common driving connection with the front ends of said worm-shafts to provide for the simultaneous rotation thereof, and propelling mechanism, substantially as set forth.

5. In a barge of the class described, the barge-body having opposite side floats unconnected at their rear ends, a suitable raising and supporting device for the ship or vessel, upright fastening-towers arranged at intervals on each of said side floats, a capstan mounted on top of each tower and carrying a fastening-cable, a horizontally-adjustable screw brace-rod working in each tower and carrying at its outer end outside of the tower a contact-roller, an adjusting-nut mounted on said screw brace-rod, worm-gearing for turning said nut to adjust the rod, said gearing having an upright adjusting-shaft projected through the top of the tower and carrying at its upper end a hand-wheel, and propelling mechanism, substantially as set forth.

6. In a barge of the class described, the barge-body having opposite side floats unconnected at their rear ends, a suitable raising and supporting device for the ship or vessel, upright fastening-towers arranged on the opposite side floats, vessel fastening and bracing devices supported by said towers, and propelling mechanism arranged at the prow end of the barge-body, substantially as set forth.

7. In a barge of the class described, a buoyant barge-body having opposite side floats unconnected at their rear ends, a suitable vessel raising and supporting device, a wheel-casing adjustably mounted at the prow end of the barge-body, screw propeller-wheels mounted within said wheel-casing, means for vertically adjusting the wheel-casing and the screw propeller-wheels therein, and driving connections with said wheels for rotating the same, substantially as set forth.

8. In a barge of the class described, a buoyant barge-body having an open propeller-housing at its under side and in the front prow portion thereof, a suitable vessel raising and supporting device carried by the barge-body, a wheel-casing mounted within said housing, a wheel-shaft journaled in said casing and carrying screw propeller-wheels, a series of guide-rods working in guide-openings at the top of the propeller-housing and connected at their lower ends with said wheel-casing, certain of said guide-rods having longitudinal racks, a suitably-operated adjusting-shaft carrying the pinions meshing with said racks, and a suitably-driven slidable rotating shaft geared with said wheel-shaft to provide for the rotation of the propeller-wheels irrespective of their vertical adjustment, substantially as set forth.

9. In a barge of the class described, a buoyant barge-body having opposite side floats unconnected at their rear ends and provided at its bottom with a series of traveler-wheels, a raising-platform arranged to work below and between the floats and carrying at its lower side a series of track-wheels, raising and lowering mechanism connected with said platform, and propelling mechanism arranged at the prow end of the barge-body, substantially as set forth.

In testimony that I claim the foregoing as my own I have hereto affixed my signature in the presence of two witnesses.

CHARLES J. SCHRAMM.

Witnesses:
JOHN H. SIGGERS,
W. J. LA VARRE.